United States Patent
Ponnuru et al.

(10) Patent No.: US 12,101,355 B2
(45) Date of Patent: Sep. 24, 2024

(54) SECURE VSAN CLUSTER USING DEVICE AUTHENTICATION AND INTEGRITY MEASUREMENTS

(71) Applicant: Dell Products L.P., Round Rock, TX (US)

(72) Inventors: Viswanath Ponnuru, Bangalore (IN); Krishnaprasad K, Bengaluru (IN); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 17/384,962

(22) Filed: Jul. 26, 2021

(65) Prior Publication Data

US 2023/0025538 A1    Jan. 26, 2023

(51) Int. Cl.
*H04L 9/00* (2022.01)
*G06F 9/54* (2006.01)
*G06F 13/10* (2006.01)
*H04L 9/40* (2022.01)
*H04L 67/1097* (2022.01)

(52) U.S. Cl.
CPC .............. *H04L 63/20* (2013.01); *G06F 9/541* (2013.01); *G06F 13/102* (2013.01); *H04L 63/08* (2013.01); *H04L 67/1097* (2013.01)

(58) Field of Classification Search
CPC ..... H04L 63/20; H04L 63/08; H04L 67/1097; G06F 9/541; G06F 13/102
See application file for complete search history.

(56) References Cited

U.S. PATENT DOCUMENTS

| | | | |
|---|---|---|---|
| 9,733,868 B2 | 8/2017 | Chandrasekaran et al. | |
| 9,858,060 B2 | 1/2018 | Barros et al. | |
| 2012/0185821 A1* | 7/2012 | Yaseen | G06F 8/35 |
| | | | 717/104 |
| 2018/0157511 A1* | 6/2018 | Krishnan | G06F 9/5061 |
| 2019/0052708 A1* | 2/2019 | Xiang | G06F 13/102 |

* cited by examiner

*Primary Examiner* — Daniel B Potratz
*Assistant Examiner* — Syed M Ahsan
(74) *Attorney, Agent, or Firm* — Larson Newman, LLP

(57) ABSTRACT

A node for a VSAN includes a BMC, a processor, and a plurality of VSAN objects. The processor instantiates a Cluster Membership, Monitoring, and Directory Service (CMMDS) and a BMC Service Module (SM). The CMMDS implements a Security Policy and Data Model (SPDM) architecture. The CMMDS determines an inventory list of the VSAN objects and a SPDM authentication state for each of the objects, and provides the inventory list and the SPDM authentication states to the BMC SM. The BMC SM provides the inventory list and the SPDM authentication state to the BMC. The BMC determines that a first VSAN object is not authenticated based upon the SPDM authentication state of the first VSAN object, and directs the CMMDS to halt input/output (I/O) operations on the VSAN to the first VSAN object.

20 Claims, 3 Drawing Sheets

SECURE VSAN CLUSTER USING DEVICE AUTHENTICATION AND INTEGRITY MEASUREMENTS

FIELD OF THE DISCLOSURE

This disclosure generally relates to information handling systems, and more particularly relates to providing secure VSAN clusters using device authentication and integrity measurements.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A node for a VSAN may include a BMC, a processor, and a plurality of VSAN objects. The processor may instantiate a Cluster Membership, Monitoring, and Directory Service (CMMDS) and a BMC Service Module (SM). The CMMDS may implement a Security Policy and Data Model (SPDM) architecture. The CMMDS may determine an inventory list of the VSAN objects and a SPDM authentication state for each of the objects, and may provide the inventory list and the SPDM authentication states to the BMC SM. The BMC SM may provide the inventory list and the SPDM authentication state to the BMC. The BMC may determine that a first VSAN object is not authenticated based upon the SPDM authentication state of the first VSAN object, and may direct the CMMDS to halt input/output (I/O) operations on the VSAN to the first VSAN object.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
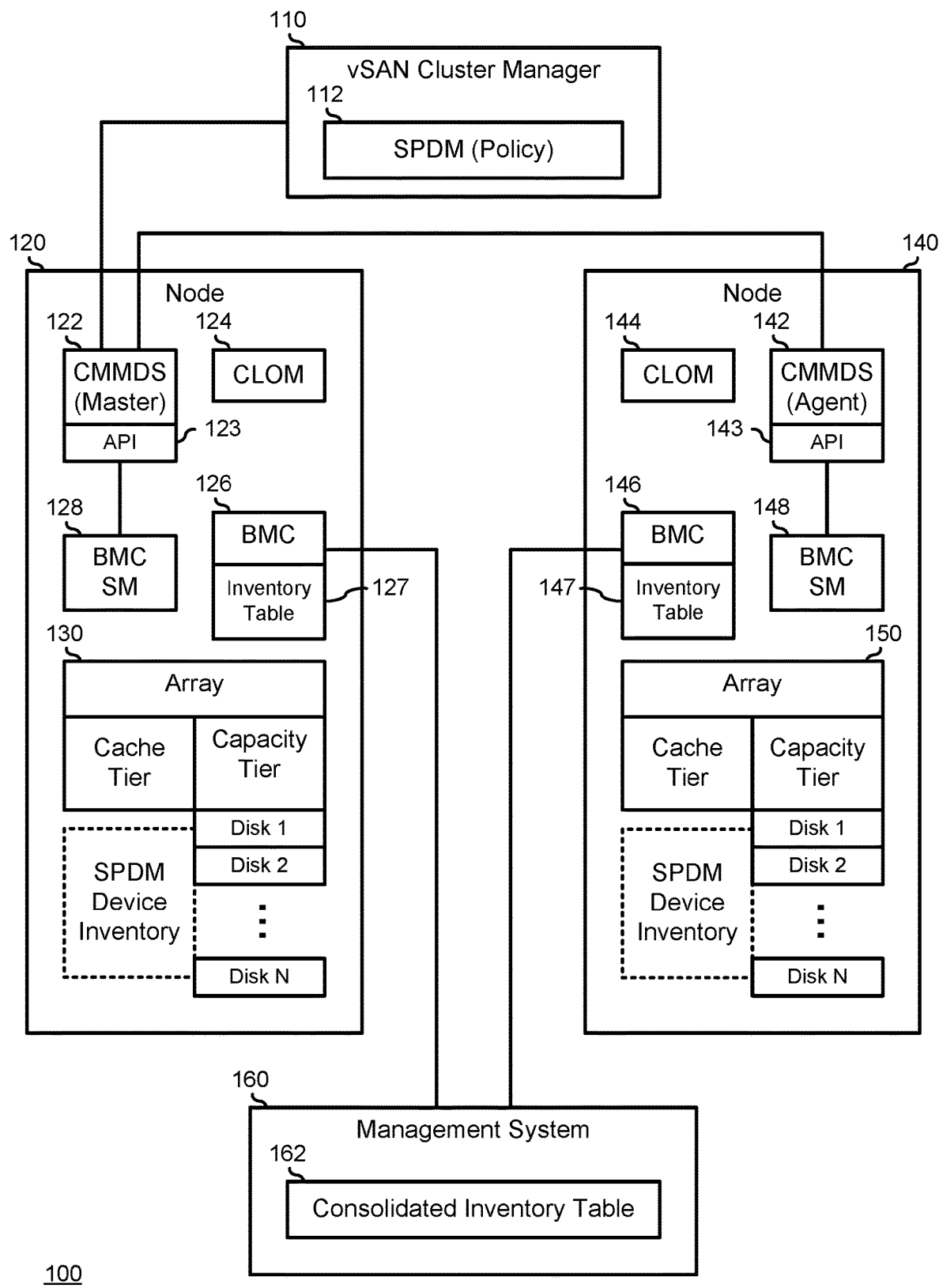
FIG. 1 is block diagram of a virtual storage area network according to an embodiment of the current disclosure.

FIG. 1 illustrates a Virtual Storage Area Network (VSAN) 100, including a VSAN cluster manager 110, a VSAN node 120, one or more additional VSAN node 140, and a management system 160. VSAN 100 represents a storage architecture that consolidates the storage capacity of an enterprise, including unused storage capacity within individual nodes of the enterprise, into a single virtualized, centrally managed storage appliance, and may be utilized to eliminate the need for dedicated storage hardware within the enterprise. VSAN manager 110 implements a Security Policy and Data Model (SPDM) architecture to facilitate secure communication between the components of VSAN 100. The SPDM architecture is provided in accordance with the Distributed Management Task Force (DMTF) specification, DSP0274. As such, VSAN manager 110 includes a SPDM policy 112, as described further below.

Node 120 includes a Cluster Membership, Monitoring, and Directory Service (CMMDS) 122, a Cluster-Level Object Manager (CLOM) 124, a Baseboard Management Controller (BMC) 126, a BMC Service Module (SM) 128, and a storage array 130. Similarly, node 140 includes a CMMDS 142, a CLOM 144, a BMC 146, a BMC SM 148, and a storage array 150. CMMDS' 122 and 142 provide overall management of the VSAN operations on respective nodes 120 and 140, including selecting objects within the nodes, gathering and maintaining inventories of the objects within the nodes, storing and maintaining metadata associated with the objects, and discovering objects within the nodes. CMMDS 122 is designated as the "Master" CMMDS, and CMMDS 142 is designated as the "Agent" CMMDS. In addition, the Master CMMDS (CMMDS 124) operates to receive updates for all nodes within VSAN 100, and to distribute the updates to the nodes. Then the Agent CMMDS (CMMDS 142) operates to implement the updates as needed. In this regard, CMMDS 122 operates to implement the updates on node 120 as needed.

CLOMs 124 and 144 validate that the selected objects can be created based upon policies and the available resources of respective nodes 120 and 140, manages the creation and migration of objects, and manages the load balancing between the nodes. BMCs 126 and 146 represent management hardware instantiated on respective nodes 120 and 140 that operate separately from the computing resources of the nodes to monitor, manage, and maintain the functions of the nodes. BMC 126 and 146 are connected to management system 160 to provide a unified management environment for VSAN 100. BMC SMs 128 and 148 represent agents instantiated within the operating system environment of respective nodes 120 and 140, and provide a bridge between the operating system environment and the management environment of BMCs 126 and 146 and management system 160.

For example, BMC SMs 128 and 148 can be connected to respective BMCs 126 and 146 via a USBNIC connection, or another OS-to-BMC passthrough connection, as needed or desired. Storage arrays 130 and 150 provide the storage capacity of respective nodes 120 and 140, and are each arranged into a cache tier and a capacity tier. The cache tiers provide read caching and write buffering for respective nodes 120 and 140, and the capacity tiers provide the bulk persistent storage of the nodes. As such, the capacity tiers are illustrated as including a number of disk storage devices. More particularly, the capacity tier devices may represent Host Bus Adapters (HBAs), disk drive devices, Solid State Drives (SSDs) such as Non-Volatile Memory-Express (NVMe) devices or the like, or other persistent data storage devices, as needed or desired. Nodes 120 and 140 include other objects of VSAN 100, including boot devices, network controller devices, Host Bus Adapters (HBAs), or other objects that may be managed as an object of a VSAN, as needed or desired.

Nodes 120 and 140 implement the SPDM architecture. In particular, the SPDM architecture provides mechanisms for component authentication and integrity at the object level. However, because VSAN 100 is a virtualization layer instantiated over the distributed hardware objects of nodes 120 and 140, the SPDM architecture does not include mechanisms for ensuring the authentication and integrity across an entire cluster such as VSAN 100. For example, when a maintenance task is planned for one or more node of a cluster, VSAN 100 lacks a unified mechanism to ensure that malicious devices are not introduced into the node, and the VSAN cannot prevent input/output (I/O) operations to un-authenticated or malicious devices connected to the VSAN. In other words, the SPDM architecture includes mechanisms to ensure that a particular object is authenticated, but lacks mechanisms to ensure the authentication status of the entire cluster.

In a particular embodiment, VSAN 100 utilizes the SPDM architecture to monitor, manage, and maintain the authentication state for all of the objects in the VSAN. Here, in addition to the determination by the SPDM architecture that any particular object is authenticated, VSAN 100 operates to ensure the overall authentication status of all of the objects within the VSAN, and, when a change is detected in the object structure on any of the nodes in the VSAN, to halt I/O operations to the affected object or node and to reestablish the authentication state of the object structure of the VSAN prior to restoring I/O operations to the changed object or node. As described hereinafter, the steps implemented on VSAN 100 to ensure the authentication status of all of the objects within the VSAN will be described only for node 120, and the similar steps will be understood to be applicable to node 140, unless otherwise noted herein.

When node 120 is initialized, BMC 126 determines a hardware inventory of the objects on the node. Here, when VSAN 100 is created, a SPDM policy 112 is provided for the VSAN that provides that the SPDM architecture is utilized to validate the objects of the VSAN. BMC 126 then initiates an SPDM request with the objects of node 120 for authentication status information for each object in the node based upon the inventory, including each PCIe device and each storage device. BMC 126 then collects the authentication status information for the objects on node 120, and provides the authentication status information to BMC SM 128.

BMC 126 establishes the authenticity for each object, and creates an authenticated inventory table 127 for node 120. Authenticated inventory table 127 includes a general metadata for each object, including, for example, a service tag number or other identifier of node 120, whether CMMDS 122 is a master CMMDS, a backup (CMMDS), or an agent CMMDS, and the like. Further, for each object within node 120, authenticated inventory table 127 includes a serial number or other identifier of the object, and, where the object is a PCI-based device, such as a SSD, a HBA, a network controller, or the like, the PCI Bus/Device/Function (BDF) information associated with the object. Further, authenticated inventory table 127 identifies whether the object is associated with the cache tier, the capacity tier, a performance tier, a boot device, a network controller, or the like. Where the object is associated with a boot device, authenticated inventory table 127 includes an Internal Dual SD Module (ID SDM) or Boot Optimized Storage Solution (BOSS) identifier.

Finally, authenticated inventory table 127 includes the SPDM status for each object, including the firmware status for the object, and health status information. Other information may be provided in authenticated inventory table 127, as needed or desired. Note that any object that is not authenticated via the SPDM authentication architecture is not added to authenticated inventory table 127 as maintained by BMC 126. Then, by comparing the inventory as provided by BMC SM 128 to BMC 126 to authenticated inventory table 127 as created by the BMC, a determination can be made as to the authentication state of node 120. If all of the objects in the inventory provided by BMC SM 128 are in authenticated inventory table 127, then node 120 is deemed to be authenticated. Otherwise, node 120 is deemed to have failed the authentication process.

An authenticated inventory table 147 is created in BMC 146 for the objects of node 140, as described above. Once authenticated inventory tables 127 and 147 are created by respective BMCs 126 and 146, the BMCs communicate the authenticated inventory tables to management system 160, and the management system creates a consolidated inventory table 162 for nodes 120 and 140. Note that VSAN 100 may be understood to include one or more additional nodes that are similar to nodes 120 and 140, and that, where the VSAN includes additional nodes, consolidated inventory table 162 will include information from additional authenticated inventory tables from each of the additional nodes.

When authenticated inventory table 127 is created and the authentication state of node 120 is established by BMC 126, the BMC passes the authentication table to BMC SMs 128, and the BMC SM forwards associated authentication information to CMMDS 122. In a particular embodiment, CMMDS 122 includes an Application Programming Interface (API) 123 that provides BMC SM 128 with access to CMMDS 122 to provide the authentication information to the CMMDS. The authentication information includes an indication that all objects of node 120 have been authenticated, or, if all objects have not been authenticated, then the authentication information indicates which objects have not been authenticated, and that such objects are thus not secure objects.

CMMDS 122 utilizes the authentication information to permit I/O operations on all of the objects of node 120 when all of the nodes have been authenticated. When not all objects have been authenticated, CMMDS 122 operates either to restrict I/O operations to the objects that failed the authentication, thus isolating the insecure objects from the rest of node 120, or to restrict the I/O operations to the entirety of node 120 and provide an indication to VSAN cluster manager 110 that the node is not secure and is off line.

Similarly, when authenticated inventory table 147 is created and the authentication state of node 140 is established by BMC 146, the BMC passes the authentication table to BMC SMs 148, and the BMC SM forwards associated authentication information to CMMDS 142. In a particular embodiment, CMMDS 142 includes an Application Programming Interface (API) 143 that provides BMC SM 148 with access to CMMDS 142 to provide the authentication information to the CMMDS. The authentication information includes an indication that all objects of node 140 have been authenticated, or, if all objects have not been authenticated, then the authentication information indicates which objects have not been authenticated, and that are thus not secure objects. CMMDS 142 utilizes the authentication information to permit I/O operations on all of the objects of node 140 when all of the objects on the node has been authenticated.

When not all objects have been authenticated, CMMDS 142 operates either to restrict I/O operations to the objects that failed the authentication, thus isolating the insecure objects from the rest of node 140, or to restrict the I/O operations to the entirety of node 140 and provide an indication to CMMDS 122 (as master CMMDS) that the node is not secure and is off line. Here, it will be understood that, as the master CMMDS, CMMDS 122 operates to provide the I/O status of nodes 120 and 140, and of all additional nodes to VSAN cluster manager 110. Then VSAN cluster manager 110 can operate to make any adjustments to the SDS structure of the nodes of VSAN 100, as needed or desired. In particular, VSAN cluster manager 110 can isolate unsecure nodes or objects from I/O operations of VSAN 100.

When an object is changed on node 120, such as when an object is unexpectedly added or removed from the node, or when an object's health status changes, CMMDS 122 determines the nature of the change and forwards the change to BMC SM 128 via API 123. BMC SM 128 provides the change information to BMC 126. If the change represents the addition of a new object, BMC 126 issues a SPDM request to obtain information related to the newly added object and attempts to authenticate the object. If the new object is authenticated, BMC 126 adds the new object to authenticated inventory table 127, forwards the updated authenticated inventory table to management system 160 for incorporation into consolidated inventory table 162, and provides the authenticated inventory table to BMC SM 128, and the new object is incorporated into the I/O operations of node 120 as described above.

If the new object is not authenticated, then the difference between the inventory table provided by BMC SM 128 and the updated authenticated inventory table 127 is provided to the BMC SM, and the new object is isolated from the I/O operations of node 120 as described above. If the change represents the removal of an object, BMC 126 deletes the object from authenticated inventory table 127, forwards the updated authenticated inventory table to management system 160 for incorporation into consolidated inventory table 162, and provides the updated authenticated inventory table to BMC SM 128, and the deleted object is excluded from the I/O operations of node 120 as described above. Finally, the change represents a change in the status or health of an object, BMC 126 issues a SPDM request to obtain information related to the changed object and attempts to authenticate the object subject to the change in status or health, and the changed object is incorporated or omitted from authenticated inventory table 127 accordingly. Changes on node 140 are handled similarly as described above.

Figure 2:
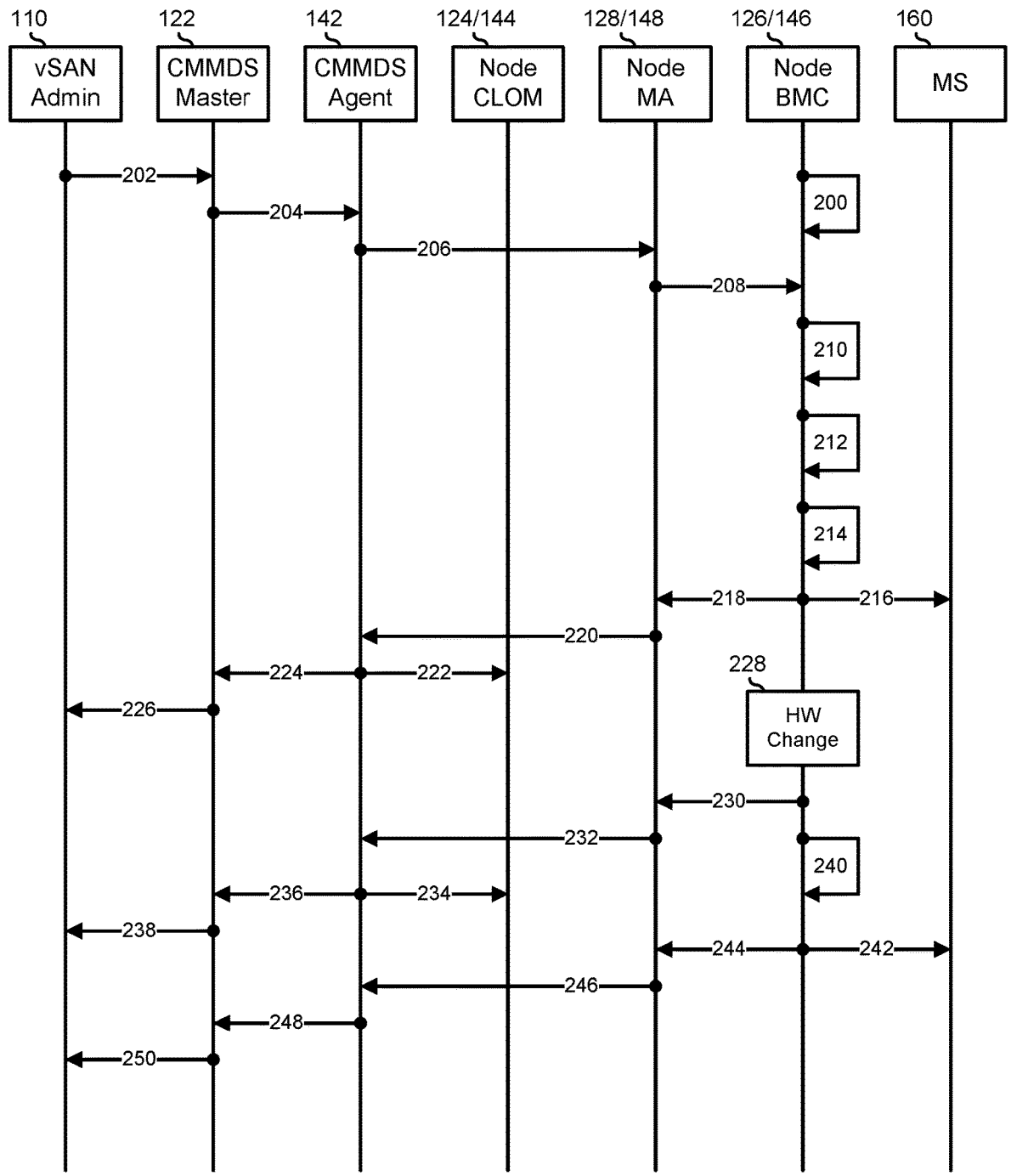
FIG. 2 is a diagram illustrating a method for establishing and maintaining the security and authentication state of the network of FIG. 1 according to an embodiment of the current disclosure.

FIG. 2 illustrates a method for establishing and maintaining the security and authentication state of VSAN 100, with actions shown between VSAN cluster manager 110, CMMDS' 122 and 142, CLOMs 124 and 144, BMCs 126 and 146, BMC SMs 128 and 148, and management system 160. In step 200, BMCs 126 and 146 collect the inventory information for all objects in respective nodes 120 and 140 and establishes SPDM authentication for the objects of the respective nodes. In step 202, VSAN cluster manager 110 creates a VSAN cluster and selects the SPDM policy, and provides the created VSAN information to CMMDS 122. In step 204, CMMDS 122 requests all CMMDS', including CMMDS' 122 and 142, to collect the SPDM status of all objects on respective nodes 120 and 140. In step 206, CMMDS' 122 and 142 establish bi-directional communications with respective BMC SMs 128 and 148 via respective APIs 123 and 143. In step 208, BMC SMs 128 and 148 send the SPDM status information request to respective BMCs 126 and 146.

In step 210, BMCs 126 and 146 create respective inventory tables 127 and 147. In step 212, BMCs 126 and 146 create filter lists of the objects in the received inventory lists for nodes respective nodes 120 and 140. In the embodiment of the current method, inventory tables 127 and 147 include all objects, and incorporate a SPDM status field for each object, instead of maintaining only the authenticated objects within the authenticated object tables as described above. As such, here, in step 214, BMCs 126 and 146 incorporate the SPDM status information into respective authentication tables 127 and 147. In step 216, BMCs 126 and 146 provides respective inventory tables 127 and 147 to management system 160 for incorporation into consolidated inventory table 162.

In step 218, BMCs 126 and 146 provide respective BMC SMs 128 and 148 the authentication status of the objects in inventory list 127, and in step 220, BMC SMs 128 and 148 provide the authentication status information to respective CCMDs 122 and 142 via respective APIs 123 and 143. In step 222, CMMDS' 122 and 142 notify respective CLOMs 124 and 144 that the authorized objects can be created, and in step 224, the agent CMMDS (CMMDS 144) notifies the master CMMDS (CMMDS 122) that node 140 is ready to allow I/O operations. In step 226, CMMDS 122, as master CMMDS, notifies VSAN cluster manager 110 that the nodes are authenticated and prepared to allow I/O operations, and the initialization of VSAN 100 is completed.

In step 228, a hardware change is detected by one of BMCs 126 and 146, and the BMCs determine the authentication status of the changed object. In response, in step 230, the particular BMC 126 or 146 notifies associated BMC SM 128 or 148 of the status change, and in step 232, the particular BMC SM notifies associated CMMDS 122 or 142 (here illustrated as the Agent CMMDS 142). In step 234, CMMDS 142 notifies the associated CLOM 144 of the unauthenticated object. Here, CLOM 144 may operate to halt I/O operations to the affected object. Further, in step 236 the agent CMMDS (e.g., CMMDS 142) notifies the master CMMDS (CMMDS 122) that node 140 has experienced a change and to stop I/O operations, and in step 236, and CMMDS 122, as master CMMDS, notifies VSAN cluster manager 110 to stop I/O operations on node 140 in step 238.

In step 240, BMC 146 determines the nature of the object change and updates inventory table 147. In particular, if the object change is the addition of a new object, BMC 126 may operate to add a new entry for the new object in inventory table 147. Here further in step 240, BMC 146 determines the authentication status of the changed object and modifies inventory table 147 accordingly. In step 242, BMC 146 provides updated inventory table 147 to management system 160 for incorporation into consolidated inventory table 162. In step 244, BMC 146 provides BMC SM 148 the authentication status of the changed object, and in step 246, BMC SM 148 provides the authentication status information to CCMD 142 via API 143. In step 248, the agent CMMDS (CMMDS 144) notifies the master CMMDS (CMMDS 122) that node 140 is ready to allow I/O operations. In step 250, CMMDS 122, as master CMMDS, notifies VSAN cluster manager 110 that node 140 are authenticated and prepared to allow I/O operations.

Figure 3:
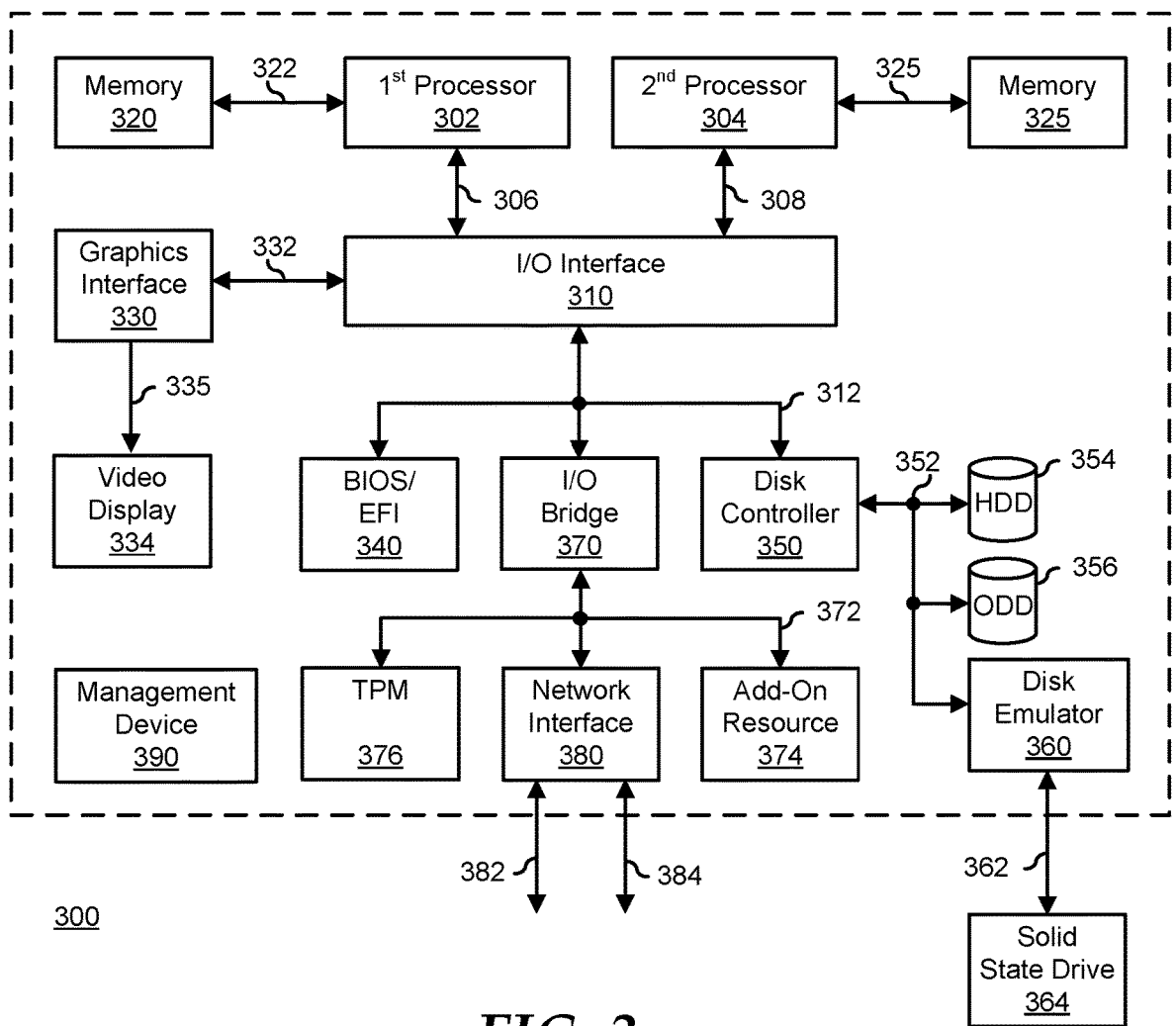
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an I/O interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A node for a virtual storage area network (VSAN), comprising:
   a Baseboard Management Controller (BMC) configured to provide a management environment on the node;
   a hardware processor configured to provide a host environment on the node, the host environment to provide a cluster membership, monitoring, and directory service (CMMDS) and a BMC service module (SM), the CMMDS configured to implement a security policy and data model (SPDM) architecture, the BMC SM configured to provide communication between the host environment and the management environment; and
   a plurality of VSAN objects;
   wherein:
   the BMC operates to determine an inventory list of the VSAN objects, to determine a SPDM authentication state for each of the objects, and provide the inventory list and the SPDM authentication state to the BMC SM;
   the BMC SM operates to provide the SPDM authentication states to the CMMDS; and
   the BMC further operates to determine that a first one of the VSAN objects is not authenticated based upon a SPDM authentication state of the first VSAN object from the SPDM authentication states, and to direct the CMMDS to halt input/output (I/O) operations on the VSAN to the first VSAN object via the BMC SM based on the determination that the first one of the VSAN object is not authenticated.

2. The node of claim 1, wherein the BMC further operates to create an inventory table including the VSAN objects and the associated SPDM authentication state for each VSAN object.

3. The node of claim 2, wherein the BMC further operates to send the inventory table to a management system of the management environment.

4. The node of claim 1, wherein the CMMDS further halts the I/O operations on the node in response to receiving the direction to halt the I/O operations on the first VSAN object.

5. The node of claim 1, wherein the CMMDS further halts the I/O operations on the first VSAN object in response to receiving the direction to halt the I/O operations on the first VSAN object.

6. The node of claim 1, wherein the CMMDS is a master CMMDS, and the CMMDS further receives a first indication from an agent CMMDS of another node of the VSAN, the first indication identifying a second VSAN object of the other node that is not authenticated based upon a SPDM authentication state of the second object.

7. The node of claim 6, wherein the CMMDS further provides a second indication to a VSAN cluster manager, the second indication indicating that the first VSAN object and the second VSAN object are not authenticated.

8. The node of claim 1, wherein the host environment is further to provide an Application Programming Interface (API) between the CMMDS and the BMC SM.

9. The node of claim 8, wherein the API operates to halt the I/O operations on the first VSAN object in response to receiving the direction to halt the I/O operations on the first VSAN object.

10. The node of claim 1, wherein the VSAN objects include one of a data storage device, a Host Bus Adapter (HBA), and a network controller.

11. A method, comprising:
providing, on a node for a Virtual Storage Area Network (VSAN), a Baseboard Management Controller (BMC) configured to provide a management environment on the node;
providing, on the node, a processor configured to provide a host environment on the node, the host environment to provide a Cluster Membership, Monitoring, and Directory Service (CMMDS) and a BMC Service Module (SM), the CMMDS configured to implement a Security Policy and Data Model (SPDM) architecture, the BMC SM configured to provide communication between the host environment and the management environment;
determining, by the BMC, an inventory list of a plurality of VSAN objects on the node;
determining, by the BMC, an SPDM authentication state for each of the objects;
providing, by the BMC, the inventory list and the SPDM authentication states to the BMC SM;
determining, by the BMC, that a first one of the VSAN objects is not authenticated based upon a SPDM authentication state of the first VSAN object from the SPDM authentication states; and
directing the CMMDS to halt input/output (I/O) operations on the VSAN to the first VSAN object based on the determination that the first one of the VSAN objects is not authenticated.

12. The method of claim 11, further comprising creating an inventory table including the VSAN objects and the associated SPDM authentication state for each VSAN object.

13. The method of claim 12, further comprising sending the inventory table to a management system of the management environment.

14. The method of claim 11, further comprising halting the I/O operations on the node in response to receiving the direction to halt the I/O operations on the first VSAN object.

15. The method of claim 11, further comprising halting the I/O operations on the first VSAN object in response to receiving the direction to halt the I/O operations on the first VSAN object.

16. The method of claim 11, wherein the CMMDS is a master CMMDS, the method further comprising receiving a first indication from an agent CMMDS of another node of the VSAN, the first indication identifying a second VSAN object of the other node that is not authenticated based upon a SPDM authentication state of the second object.

17. The method of claim 11, further comprising receiving a second indication to a VSAN cluster manager, the second indication indicating that the first VSAN object and the second VSAN object are not authenticated.

18. The method of claim 11, further comprising providing an application programming interface (API) between the CMMDS and the BMC SM.

19. The method of claim 18, further comprising halting, by the API, the I/O operations on the first VSAN object in response to receiving the direction to halt the I/O operations on the first VSAN object.

20. A virtual storage area network (VSAN), comprising:
a VSAN cluster manager;
a first node; and
a second node:
the first node including:
a plurality of VSAN objects;
a Baseboard Management Controller (BMC) configured to provide a management environment on the node, and to determine an inventory list of the VSAN objects; and
a hardware processor configured to provide a host environment on the node, the host environment to provide a cluster membership, monitoring, and directory service (CMMDS) and a BMC service module (SM), the CMMDS configured to implement a security policy and data model (SPDM) architecture, the BMC SM configured to provide communication between the host environment and the management environment;
wherein:
the CMMDS is a master CMMDS;
the BMC operates to determine an SPDM authentication state for each of the objects, to provide the SPDM authentication states to the BMC SM, to determine that a first one of the VSAN objects is not authenticated based upon a SPDM authentication state of the first VSAN object from the SPDM authentication states, and to direct the CMMDS to halt input/output (I/O) operations on the VSAN to the first VSAN object via the BMC SM based on the determination that the first one of the VSAN objects is not authenticated; and
the CMMDS further receives a first indication from an agent CMMDS of the second node, the first indication identifying a second VSAN object of the second node that is not authenticated based upon the SPDM authentication state of the second VSAN object from the SPDM authentication states, and provides a second indication to the VSAN cluster manager, the second indication indicating that the first VSAN object and the second VSAN object are not authenticated.

\* \* \* \* \*